United States Patent
Anderson et al.

(10) Patent No.: US 9,746,700 B2
(45) Date of Patent: Aug. 29, 2017

(54) SILICON PHOTONIC HYBRID POLARIZATION DEMULTIPLEXER

(71) Applicant: Cisco Technology, Inc., San Jose, CA (US)

(72) Inventors: Sean Anderson, Macungie, PA (US); Mark Webster, Bethlehem, PA (US); Kalpendu Shastri, Orefield, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 14/326,309

(22) Filed: Jul. 8, 2014

(65) Prior Publication Data
US 2016/0013868 A1    Jan. 14, 2016

(51) Int. Cl.
| | |
|---|---|
| H04J 14/06 | (2006.01) |
| H04B 10/12 | (2006.01) |
| H04B 10/00 | (2013.01) |
| G02F 1/035 | (2006.01) |
| G02F 1/015 | (2006.01) |
| G02F 1/01 | (2006.01) |
| G02F 1/025 | (2006.01) |
| G02F 1/225 | (2006.01) |

(52) U.S. Cl.
CPC ............ *G02F 1/015* (2013.01); *G02F 1/0123* (2013.01); *G02F 1/0147* (2013.01); *G02F 1/025* (2013.01); *G02F 1/225* (2013.01); *G02F 2203/50* (2013.01)

(58) Field of Classification Search
USPC .......................... 398/65, 141, 152, 205, 210
See application file for complete search history.

(56) References Cited

U.S. PATENT DOCUMENTS

| | | | | |
|---|---|---|---|---|
| 5,751,248 | A * | 5/1998 | Thaniyavarn | H01Q 3/2676 342/368 |
| 2003/0091213 | A1* | 5/2003 | Yamakage | G06T 1/005 382/100 |
| 2004/0114929 | A1* | 6/2004 | Madsen | H04J 14/0298 398/79 |
| 2005/0068887 | A1* | 3/2005 | Chen | H04B 10/506 370/215 |
| 2005/0175353 | A1* | 8/2005 | Morgan | H04B 10/2569 398/149 |
| 2005/0185970 | A1* | 8/2005 | Madsen | H04B 10/2569 398/202 |
| 2006/0083144 | A1* | 4/2006 | Piede | G02F 1/025 369/100 |
| 2007/0047872 | A1* | 3/2007 | Clapp | G02F 1/21 385/27 |
| 2009/0245794 | A1* | 10/2009 | Sakharov | H04J 14/02 398/79 |

(Continued)

*Primary Examiner* — David Payne
*Assistant Examiner* — Pranesh Barua
(74) *Attorney, Agent, or Firm* — Polsinelli PC

(57) ABSTRACT

An optical demultiplexer that includes at least one a hybrid phase shifter configured to receive a light signal over a fiber element, the light signal including polarized optical signals. Each phase shifter includes a thermo-optic phase shifter configured to phase shift the light signal, an electro-optic phase shifter configured to phase shift the light signal, and a coupler configured to maintain polarization of the polarized signal components. The optical demultiplexer also includes control circuitry configured to regulate the thermo-optic and electro-optic phase shifters.

20 Claims, 3 Drawing Sheets

(56) References Cited

U.S. PATENT DOCUMENTS

| | | | |
|---|---|---|---|
| 2010/0142964 A1* | 6/2010 | Chang | H04B 10/50575 398/116 |
| 2010/0196008 A1* | 8/2010 | Szafraniec | H04B 10/2569 398/65 |
| 2010/0310260 A1* | 12/2010 | Mandai | H04B 10/677 398/202 |
| 2010/0322631 A1* | 12/2010 | Nagarajan | G02B 6/12004 398/65 |
| 2011/0044573 A1* | 2/2011 | Webster | G02F 1/0121 385/3 |
| 2011/0222813 A1* | 9/2011 | Webster | G02F 1/2257 385/3 |
| 2012/0251118 A1* | 10/2012 | McNicol | H04B 10/61 398/82 |
| 2013/0188971 A1* | 7/2013 | Painchaud | H04B 10/612 398/214 |
| 2014/0348460 A1* | 11/2014 | Dorin | G02B 6/2766 385/3 |

\* cited by examiner

SILICON PHOTONIC HYBRID POLARIZATION DEMULTIPLEXER

TECHNICAL FIELD

The present disclosure relates to an apparatus and method for providing a low-loss silicon photonic polarization demultiplexer having a high-bandwidth control loop.

BACKGROUND

Silicon photonics is an evolving technology that transmits data as light pulses along optical fibers. Multiplexers combine the light pulses into a single signal that is transmitted along an optical fiber where a demultiplexer divides the signal back into separate channels. Although active demultiplexing exists in silicon photonics systems, the tracking speed is far too slow to be of practical use. Tracking speed is limited by the bandwidth, i.e., the response time, exhibited by state of the art demultiplexers. Further, other types of demultiplexers exhibit large insertion loss that has proven to be unacceptable. Therefore, there is a need for a demultiplexer that provides both sufficient control bandwidth and low insertion loss and that is applicable for silicon photonics systems.

BRIEF DESCRIPTION OF THE DRAWINGS

There are shown in the drawings embodiments that are presently preferred it being understood that the disclosure is not limited to the arrangements and instrumentalities shown, wherein.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

In one aspect of the present disclosure, a polarization demultiplexer is provided. The demultiplexer includes at least one hybrid phase shifter configured to receive a light signal over a fiber element, the light signal including polarized optical signals. Each phase shifter includes a thermo-optic phase shifter configured to phase shift the polarized optical signal, an electro-optic phase shifter configured to phase shift the polarized optical signal, and control circuitry configured to regulate the thermo-optic and electro-optic phase shifters.

In another aspect of the present disclosure, a hybrid phase shifter is provided. The hybrid phase shifter includes a thermo-optic phase shifter configured to phase shift polarized optical signals of a light signal, where the thermo-optic phase shifter receives a control signal from control circuitry. The hybrid phase shifter also includes an electro-optic phase shifter configured to phase shift the polarized optical signals, where the electro-optic phase shifter receives a dither signal from the control circuitry, the control signal and the dither signal having different amplitudes.

In yet another aspect of the present disclosure, a method of demultiplexing a polarization-multiplexed optical signal is provided. The method includes receiving a light signal over a fiber element, the light signal including polarized optical signals, and separating the polarized optical signals of the light signal received over the fiber element. The separating includes providing a plurality of mixing stages, each mixing stage comprising a thermo-optic phase shifter and an electro-optic phase shifter adapted to phase shift the polarized optical signals.

DETAILED DESCRIPTION

Figure 1:
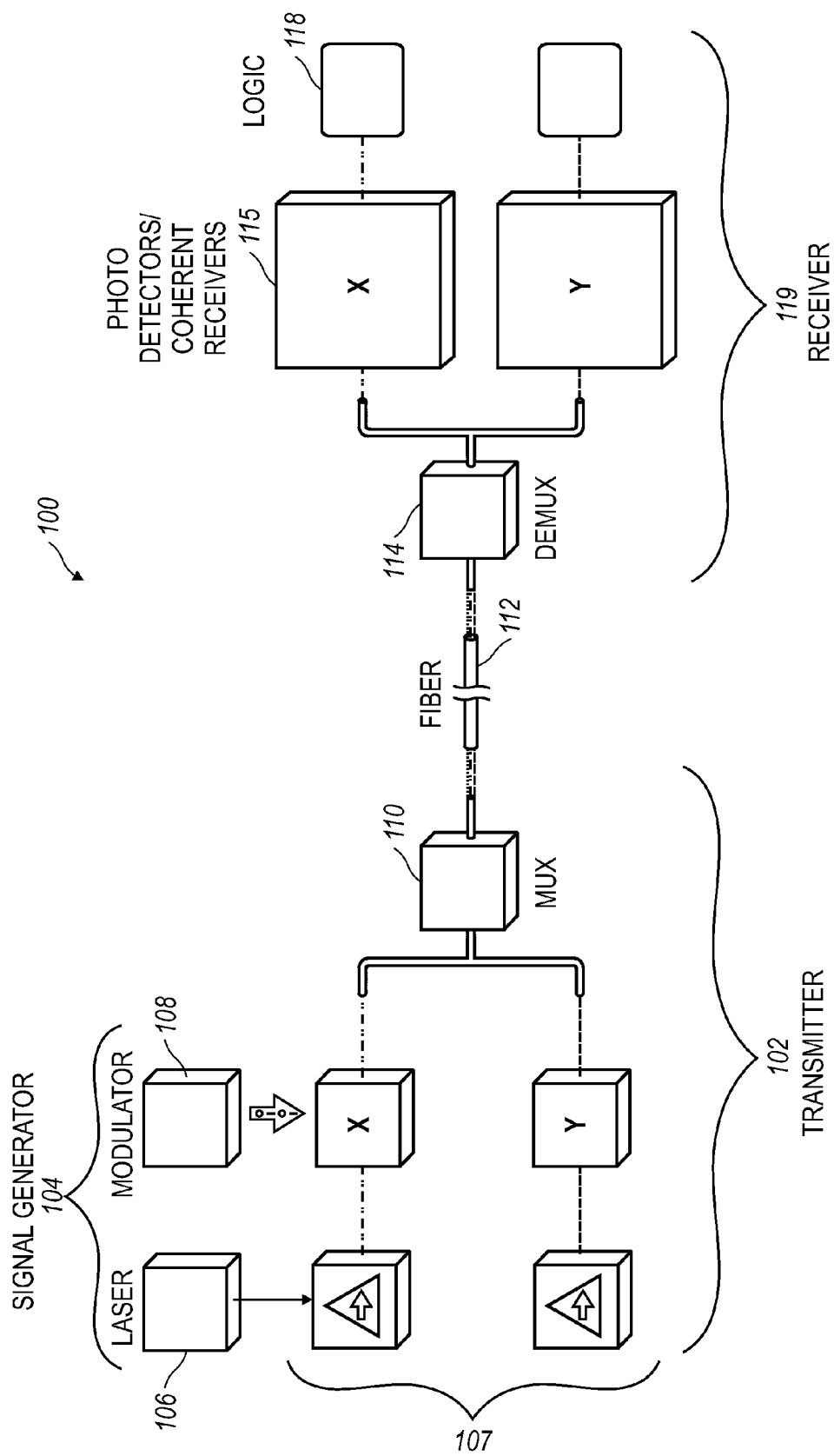
FIG. 1 illustrates is an example of a silicon photonics network utilizing the silicon photonic hybrid polarization demultiplexer of the present disclosure.

The present disclosure describes a low-loss active polarization demultiplexer using pre-existing silicon photonics building blocks. Specifically, a hybrid polarization multiplexer that combines both electro-optic and thermo-optic phase shift elements is used in an optical network. An example of an optical network 100 utilizing the hybrid demultiplexer of the present disclosure is shown in FIG. 1. Optical network 100 includes a transmitter 102, which includes a signal generator 104, having a laser 106 and a modulator 108, and a multiplexer 110. Laser 106 creates a beam of light having light pulses 107 of different wavelengths. Modulator 108 encodes data onto each light pulse 107. The modulated light is then passed on to multiplexer 110, which combines each of the multiple wavelengths of the modulated light onto a glass fiber 112, and on to receiver 119. Receiver 119 includes hybrid demultiplexer 114 of the present disclosure, which splits off the individual wavelengths where they are sent to photodetectors 115, or coherent receivers, that convert the optical data into electrical data. Logic 118 then processes the data. The optical network 100 of FIG. 1 is illustrative only, and the hybrid demultiplexer 114 of the present disclosure is equally applicable to other optical network designs.

Figure 2:
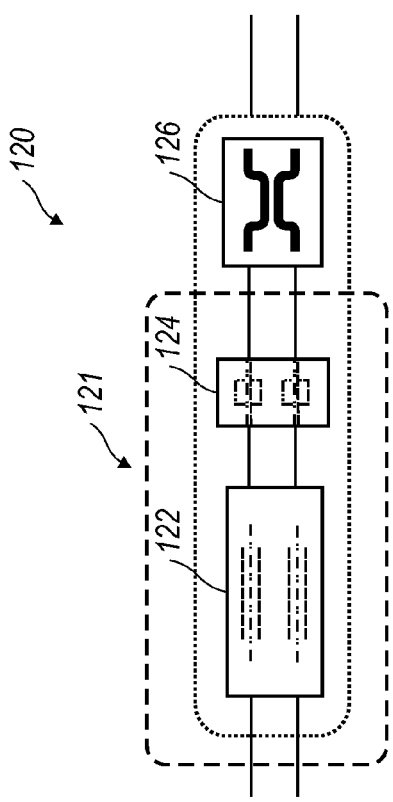
FIG. 2 illustrates an example of a hybrid phase shifter of the present disclosure using both thermal and electro-optic phase shifters.

FIG. 2 is an example of a hybrid phase shifter 121 that is one of the components of hybrid polarization demultiplexer 114. Hybrid phase shifter 121 includes both a thermal phase shifter 122 and an electro-optic phase shifter 124. The combination of thermal phase shifter 122 and electro-optic phase shifter 124 provides advantages that demultiplexers using only thermal phase shifters or only electro-optic phase shifter do not provide. Typical thermo-optic phase shifters require a control bandwidth of approximately 10 kHz. This requires dither tones to be applied at frequencies much larger than 10 kHz, which is insufficient for implementation of a control loop. Thus, the use of thermo-optic phase shifters alone cannot provide the adequate bandwidth necessary for implementation of a control loop. On the other hand, the use of only electro-optic phase shifters, due to their high loss, typically over 2 dB for a π phase shift, result in an unacceptable insertion loss. In other words, the bandwidth of the thermo-optic phase shifter is insufficient to support a dither signal and the electro-optic phase shifter has too high of an optical insertion loss to be effective. Advantageously, the use of hybrid elements, e.g., thermal phase shifter 122 and electro-optic phase shifter 124, results in a high phase excursion, low loss, and sufficient bandwidth. A coupler 126, such as, for example a 2×2 coupler, can be used in connection with hybrid phase shifter 121, to form a mixing stage 120, that maintains the polarization of the multiplexed signal.

Figure 3:
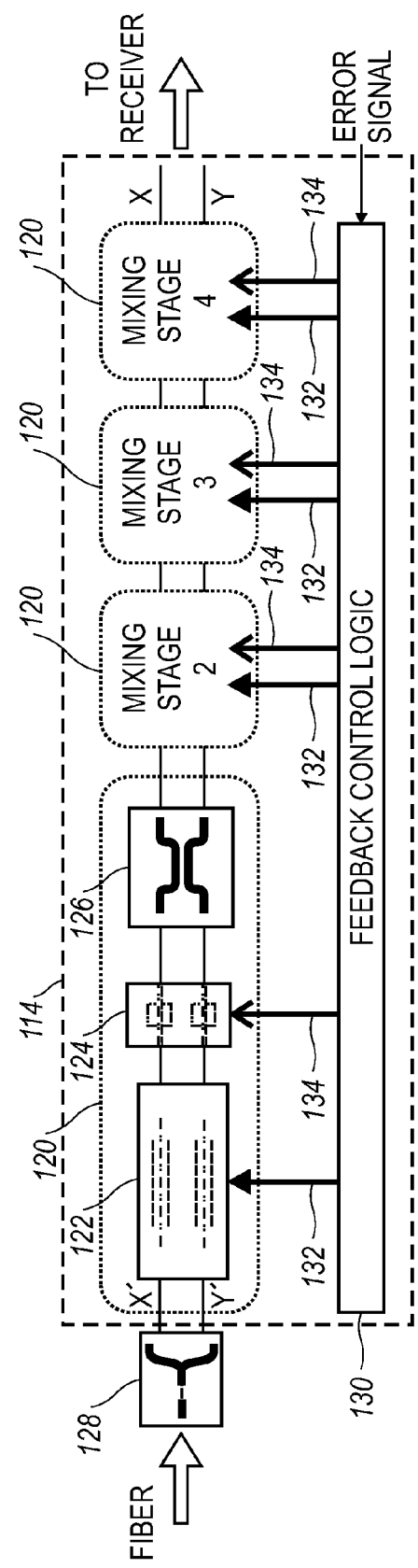
FIG. 3 illustrates an example of the hybrid polarization demultiplexer of the present disclosure including a series of mixing stages.

FIG. 3 illustrates a series of cascaded mixing stages 120, forming demultiplexer 114, as part of a polarization multiplexed network. Each mixing stage 120 includes hybrid phase shifter 121, which includes thermo phase shifter 122, electro-optic phase shifter 124, and coupler 126. In the illustrated example, four mixing stages 120 are cascaded in order to effectively separate the polarized signals of the light beam, as described above. Although four cascaded mixing stages 120 are shown in FIG. 3, it is within the spirit of the invention to include less or more than the number of mixing stages 120 shown in FIG. 3. In the example shown in FIG. 3, a light signal, comprised of two polarized optical signals, X and Y, are transmitted along a fiber. The fiber rotates and mixes these signals. A polarization splitter 128 separates the light signal into an X' signal and a Y' signal, each of which represents a rotated and/or mixed version of the transmitted X and Y polarized signals. Polarization demultiplexer 114 of the present disclosure is needed to recover the original signals X and Y from the mixed X' and Y' signals. This is accomplished by application of appropriate control voltages or currents, as discussed in further detail below.

Feedback control logic 130 applies the appropriate voltages to continuously regulate and adjust the signal applied to each mixing stage 120. Feedback control logic 130 regulates each mixing stage 120 by applying separate control and dither signals, rather than a combined signal. Error signals for feedback control logic 130 can be generated from a variety of sources. For example, in one example, pilot tones or pilot signals are applied on one or both polarizations at transmitter 102. In another example, an error signal can be generated from a bit error rate ("BER") measurement.

Specifically, feedback control logic 130 applies control signals 132 to each thermal-optic shifter 122 and separate dither signals 134 to each electro-optic shifter 124. In order to avoid interference between control signal 132 and dither signal 134, each dither signal 134 has a smaller amplitude than the amplitude of each control signals 132. In one example, dither signals 134 are on the order of a few percent of the control signals 132. Thus, in this example, control signals 132 have a bandwidth on the order of 10 s of kHz while dither signals 134 have a bandwidth in the MHz range. Therefore, the length of each electro-optic phase shifter is relatively short, for example, on the order of 10 microns or less, in comparison to the length of the thermal phase shifter 122. FIGS. 2 and 3 illustrate this relative difference in phase shift by depicting a longer thermal phase shifter 122 and a shorter electro-optic phase shifter 124.

In the example shown in FIG. 3, where four mixing stages 120 are provided in a cascaded fashion, if electro-optic phase elements alone were used, the insertion loss would be approximately 8 dB (four stages at a 2 dB loss per stage). If the polarization demultiplexer is based solely on thermo-optic phase shift elements, the insertion loss would be approximately less than 0.5 dB but would result in insufficient bandwidth to allow practical dither-based control algorithms. However, because the high frequency dither signal used in hybrid demultiplexer 114 of the present disclosure has a relatively small amplitude, the phase shift of the electro-optic phase shifter 124 is short, on the order of 10 s of microns, and the resulting insertion loss is less than 0.2 dB for each electro-optic phase shifter 124. Thermo-optic phase shifters 122 can be sized to obtain a phase shift of approximately $\pi$ or $2\pi$, or on the order of approximately 100 microns. Thus, thermo-optic phase shifters 122 have a negligible insertion loss of approximately 0.1 decibels for a Tr shift. Therefore, when compared to an approach that is based entirely on electro-optic phase shifters, the hybrid demultiplexer 114 of the present disclosure results in a very low insertion loss, e.g., on the order of 0.3 dB per mixing stage 120 as compared to at least 8 dB when four electro-optic phase shifters, while providing sufficient bandwidth.

Figure 4:
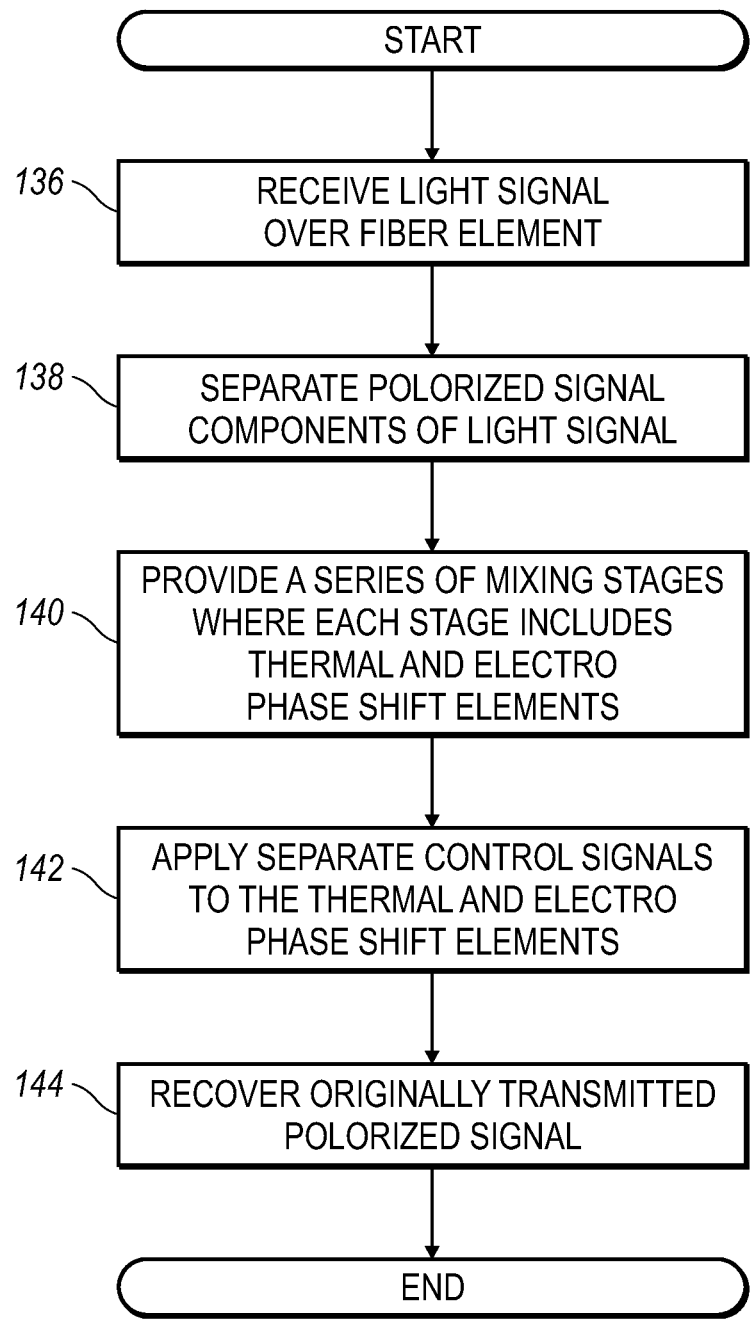
FIG. 4 illustrates a method incorporating the silicon photonic hybrid polarization demultiplexer of the present disclosure.

FIG. 4 illustrates an example of a method utilizing the hybrid polarization demultiplexer 114 of the present disclosure. A light signal is received over a fiber element, at step 136. The light signal includes polarized optical signals. However, during transmission, these optical signals can become rotated and/or mixed. For example, a light signal containing orthogonally polarized optical signals X and Y may arrive at polarization splitter 128. Polarization splitter 128 can separate the signal components into X' and Y' of the light signal, at step 138. However, signals X' and Y' are only a combination of the originally-transmitted X and Y signal components due to the mixing that occurred during transmission along the fiber element. Demultiplexer 114 includes a series of mixing stages 120 which are provided in a cascaded manner, at step 140. Each mixing stage 120 includes a thermo-optic phase shifter 122 and an electro-optic phase shifter 124. Feedback control logic 130 provides separate control signals to the thermo-optic and electro-optic phase shifters, at step 142. After the signals have passed through the mixing stages 120, demultiplexer 114 outputs the originally transmitted polarized optical signals X and Y, at step 144.

The hybrid demultiplexer of the present disclosure provides a combination of electro-optic and thermal-optic phase shift elements such that each phase shift element is separately controlled: a dither signal controls the electro-optic phase shifter and a separate demultiplexer control signal controls the thermo-optic phase shifter. This allows the use of dither tones having a frequency far above the control signal bandwidth. Advantageously, the hybrid demultiplexer of the present disclosure is applicable to silicon photonics networks because it utilizes only existing Silicon building blocks such as thermo-optic phase shifters, electro-optic phase shifters such as silicon-insulator-silicon capacitive (SISCAP) structures, and 2×2 couplers.

The hybrid demultiplexer of the present disclosure also provides low excess loss which is superior to an electro-optic only approach, and low power consumption. For example, each thermal phase shifter consumes approximately 25 mW while each electro-optic phase shifter consumes approximately less than 10 mW. Thus, in the four phase shifter scenario shown in the figures, less than 200 mW are consumed. Further, the hybrid demultiplexer described herein is compatible with pre-existing control algorithms used with other polarization demultiplexing methodologies, can be implemented without the need for coherent receivers or digital signal processors (DSPs), and can be implemented regardless of the type of modulation format and data rate.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The specification and drawings are, accordingly, to be regarded in an illustrative rather than a restrictive sense. It will, however, be evident that various modifications and changes may be made thereunto without departing from the broader spirit and scope of various aspects of the disclosure as set forth in the claims.

We claim:

1. A polarization demultiplexer comprising:
   at least one hybrid phase shifter configured to receive a light signal over a fiber element, the light signal including polarized optical signals, the at least one hybrid phase shifter each comprising:
      a thermo-optic phase shifter configured to phase shift the polarized optical signals;
      an electro-optic phase shifter configured to phase shift the polarized optical signals, wherein the electro-optic phase shifter and the thermo-optic phase shifter are connected in series, and wherein the electro-optic phase shifter is shorter in length than the thermo-optic phase shifter; and
      control circuitry configured to regulate the thermo-optic and electro-optic phase shifters to reduce an insertion loss of the hybrid phase shifter while still maintaining a sufficient control bandwidth.

2. The polarization demultiplexer of claim 1, each hybrid phase shifter further comprising a coupler configured to maintain polarization of the polarized signal components, the coupler and the hybrid phase shifter forming a mixing stage.

3. The polarization demultiplexer of claim 2, further comprising a plurality of cascaded mixing stages.

4. The polarization demultiplexer of claim 1, wherein the thermo-optic phase shifter receives a control signal from the control circuitry, and the electro-optic phase shifter receives a dither signal from the control circuitry, the control signal and the dither signal having different amplitudes.

5. The polarization demultiplexer of claim 4, wherein the dither signal has an amplitude that is less than an amplitude of the control signal.

6. The polarization demultiplexer of claim 1, wherein the polarized signal components are substantially orthogonal with respect to each other.

7. The polarization demultiplexer of claim 1, wherein the electro-optical phase shifter includes one of a MOS capacitor, a PN junction, a P-I-N junction, or a Lithium Niobate (LiNbO3) phase modulator.

8. A hybrid phase shifter comprising:
   a thermo-optic phase shifter configured to phase shift polarized optical signals of a light signal, the thermo-optic phase shifter receiving a control signal from control circuitry; and
   an electro-optic phase shifter, shorter in length than the thermo-optic phase shifter and connected in series with the thermo-optic phase shifter and configured to phase shift the polarized optical signals, the electro-optic phase shifter receiving a dither signal from the control circuitry in order to reduce an insertion loss of the hybrid phase shifter, the control signal and the dither signal having different amplitudes.

9. The hybrid phase shifter of claim 8, wherein the dither signal has an amplitude that is less than an amplitude of the control signal.

10. The hybrid phase shifter of claim 8, wherein the polarized signal components are substantially orthogonal with respect to each other.

11. The hybrid phase shifter of claim 8, wherein the electro-optical phase shifter includes one of a MOS capacitor, a PN junction, a P-I-N junction, or a Lithium Niobate (LiNbO3) phase modulator.

12. A method of demultiplexing a polarization-multiplexed optical signal, the method comprising:
   receiving a light signal over a fiber element, the light signal including polarized optical signals; and
   separating the polarized optical signals of the light signal received over the fiber element, the separating comprising:
      providing a plurality of mixing stages, each mixing stage comprising a thermo-optic phase shifter and an electro-optic phase shifter connected in series and adapted to phase shift the polarized optical signals, wherein the electro-optic phase shifter of each mixing stage is shorter in length than the thermo-optic phase shifter of the same mixing stage.

13. The method of claim 12, further comprising:
   applying control signals to the thermo-optic phase shifter and the electro-optic phase shifter of each mixing stage.

14. The method of claim 13, wherein the control signal applied to the thermo-optic phase shifter is separate from the control signal applied to the electro-optic phase shifter.

15. The method of claim 14, wherein the control signal applied to the electro-optic phase shifter is a dither signal.

16. The method of claim 15, wherein the dither signal applied to the electro-optic phase shifter has an amplitude different from an amplitude of the control signal applied to the thermo-optic phase shifter.

17. The method of claim 16, wherein the amplitude of the dither signal is smaller than the amplitude of the control signal applied to the thermo-optic phase shifter.

18. The method of claim 12, wherein the polarized optical signals are substantially orthogonal with respect to each other.

19. The method of claim 12, wherein a phase shift provided by the electro-optic phase shifter is shorter than a phase shift provided by the thermal-optic phase shifter.

20. The method of claim 12, wherein the electro-optical phase shifter includes one of a MOS capacitor, a PN junction, a P-I-N junction, or a Lithium Niobate (LiNbO3) phase modulator.

\* \* \* \* \*